United States Patent [19]

Majewski

[11] Patent Number: 4,539,936
[45] Date of Patent: Sep. 10, 1985

[54] ANIMAL DOOR SCRATCH PREVENTER

[76] Inventor: Frank Majewski, 6518 N. Oak Park Ave., Chicago, Ill. 60631

[21] Appl. No.: 600,412

[22] Filed: Apr. 16, 1984

[51] Int. Cl.³ .............................................. A01K 29/00
[52] U.S. Cl. ......................................... 119/29; 40/331
[58] Field of Search ................... 119/29, 29.5; 40/331; 49/460

[56] References Cited

U.S. PATENT DOCUMENTS

| | | | |
|---|---|---|---|
| 2,698,598 | 1/1955 | Hadley | 119/29 |
| 3,085,551 | 4/1963 | Helmer | 119/29 X |
| 3,916,838 | 11/1975 | Swart | 119/29 |
| 4,422,852 | 12/1983 | Mathias | 40/331 X |

*Primary Examiner*—Robert P. Swiatek
*Attorney, Agent, or Firm*—Wm. A. Snow

[57] ABSTRACT

An elongated, heavy plastic strip substantially covering the stile of a door containing the door handle and extending in a vertical direction therefrom and removably secured to the door handle at one end and having elements to removably secure the plastic strip to the lower end of the bottom rail of the door.

1 Claim, 4 Drawing Figures.

ANIMAL DOOR SCRATCH PREVENTER

BACKGROUND OF THE INVENTION

Domesticated animals such as dogs usually scratch the stile of a door with the claws in the front paws to go out of the house, constant scratching causing grooves in the stile and ruining the door. It was to overcome this inherent defect that the present invention was conceived.

A patentability search was conducted and the following patents were found: U.S. Pat. Nos. 2,131,874; 3,563,594; 3,704,037: but these patents failed to disclose the present invention.

SUMMARY OF THE INVENTION

An elongated strip of heavy plastic substantially covering the stile of a door containing the door handle and extending below the handle and short of the bottom rail, including means on the upper end of the plastic strip to removably attach the plastic to the door handle and suspend the plastic strip therefrom and a spring secured to the opposed or bottom end of the plastic strip supporting a right angle piece of metal so that one of the legs of the metal may be inserted under the bottom rail of the door to hold the strip of plastic in place against the stile and prevent displacement.

DETAILED DESCRIPTION OF THE INVENTION

Figure 1:
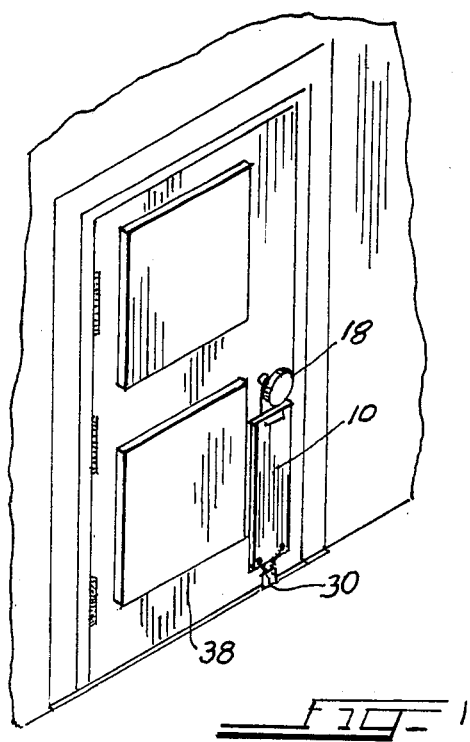
FIG. 1 is a perspective view of the device of the present invention in place on a door with parts broken away.
Figure 2:
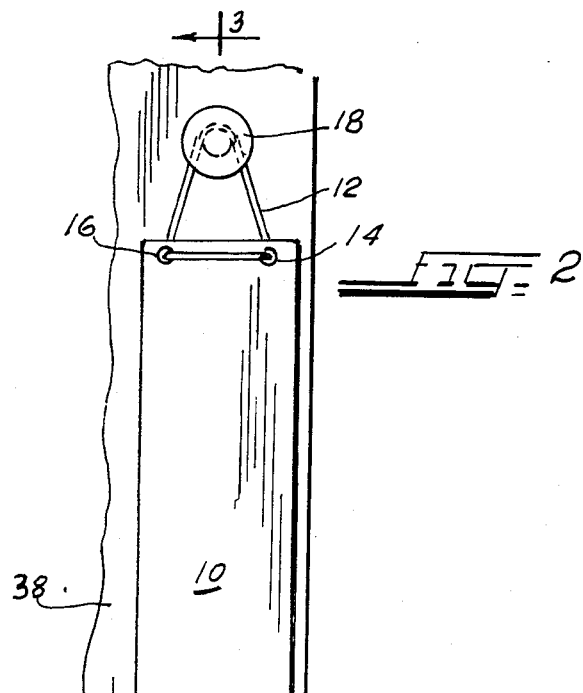
FIG. 2 is a front plan view of the device of the present invention in place on a door, with parts broken away.
Figure 3:
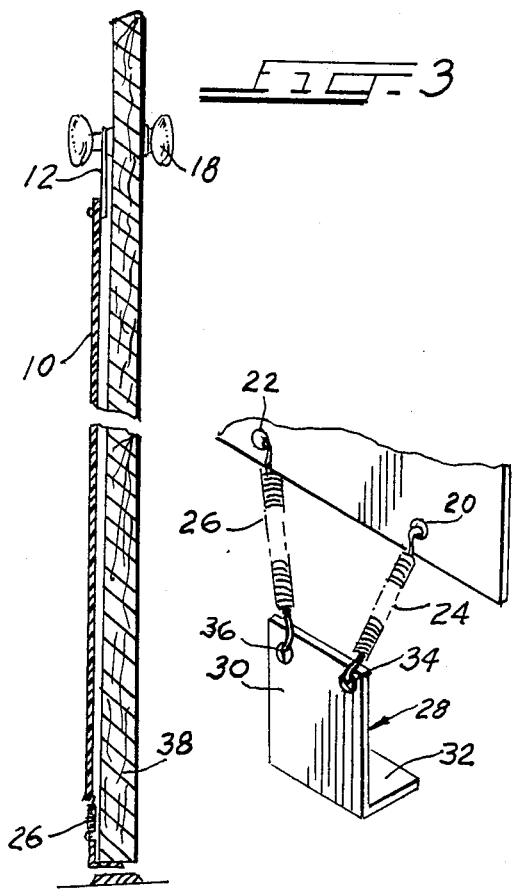
FIG. 3 is a cross-sectional view of the device of the present invention taken on the lines 3—3 of FIG. 2 with the parts of the door shown in full lines.
Figure 4:
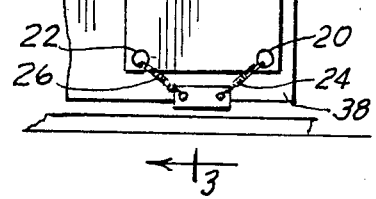
FIG 4 is an enlarged perspective view of the springs, right angled metal and the lower end of the plastic, parts being broken away.

An elongated piece of heavy plastic strip 10 of a width substantially the same as the stile of a door has a piece of cord 12 secured to the upper end terminating in a loop. The cord 12 is threaded between two spaced apertures 14, 16 in the upper end of the plastic strip whereby a loop is formed by the cord 12 and may be placed on the door knob 18 whereby the plastic strip 10 is suspended therefrom.

The lower end of the strip of plastic 10 is also provided with a pair of spaced apertures 20, 22 into which the hooked ends of springs 24, 26 are positioned one in each aperture and anchored.

A right angled piece of metal 28 is provided with a pair of leaves 30, 32. The upper end of leaf 30 is provided with a pair of spaced apertures 34, 36 into which hooks on the opposite ends of the springs 26, 24 are placed and anchored one in each aperture 34, 36, thus suspending the right angled member on the plastic strip.

in operation, the loop in cord 12 is placed over the handle 18 and the leaf 32 is drawn down against the action of the springs 24, 26 and the leaf 32 is then placed under the bottom rail 38 of the door thus the plastic strip substantially covers the stile below the handle 18 and prevents dislodgement of the plastic strip.

It should be apparent that any means may be used to suspend the plastic from the handle and only one spring may be used.

Although but one specific embodiment of this invention is herein shown and described, it will be understood that details of the construction shown may be altered or omitted without departing from the spirit of the invention as defined by the following claims.

I claim:

1. A device for preventing a domestic animal from scratching the stile of the door below the handle, comprising a relatively thick plastic elongated strip, a cord secured to the upper end of said strip forming a loop to be placed over the doorknob, and strip having a pair of spaced apertures adjacent the lower end thereof, a pair of coil springs having two ends, one end of each spring secured in one of said apertures of said strip, a right angled rigid member having a pair of leaves, one extending vertically and the other right angled, the vertical leaf being provided with a pair of spaced apertures at the upper end thereof into which the opposite ends of the springs are anchored, one in each aperture whereby the right angled leaf is placed under the bottom rail of the door to prevent dislodgement of the plastic strip.

* * * * *